(12) United States Patent
Chipouras et al.

(10) Patent No.: US 11,060,875 B2
(45) Date of Patent: Jul. 13, 2021

(54) AUTOMATED IDENTIFICATION OF PROBLEMATIC LOCATIONS FOR NAVIGATION AND ROUTE GUIDANCE MODIFICATION FOR DYNAMIC ALERTING

(71) Applicant: Verizon Patent and Licensing Inc., Arlington, VA (US)

(72) Inventors: John Chipouras, Denver, CO (US); Joshua D. Eno, Denver, CO (US); Daniel Austin Kopyc, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 236 days.

(21) Appl. No.: 16/185,831

(22) Filed: Nov. 9, 2018

(65) Prior Publication Data

US 2020/0149900 A1 May 14, 2020

(51) Int. Cl.
*G01C 21/34* (2006.01)
*G01C 21/36* (2006.01)
*G05D 1/00* (2006.01)

(52) U.S. Cl.
CPC ..... *G01C 21/3415* (2013.01); *G01C 21/3492* (2013.01); *G01C 21/367* (2013.01); *G01C 21/3655* (2013.01); *G01C 21/3679* (2013.01); *G05D 1/0088* (2013.01)

(58) Field of Classification Search
CPC ........... G01C 21/3415; G01C 21/3492; G01C 21/3655; G01C 21/3679; G01C 21/367; G01C 21/3697; G01C 21/3626; G05D 1/0088
See application file for complete search history.

(56) References Cited

U.S. PATENT DOCUMENTS

| | | | | |
|---|---|---|---|---|
| 10,718,638 B1* | 7/2020 | Diehl | ........................ | G01D 5/30 |
| 2013/0305357 A1* | 11/2013 | Ayyagari | ............ | H04B 7/18593 |
| | | | | 726/22 |
| 2014/0200805 A1* | 7/2014 | Modica | .................. | G01C 21/30 |
| | | | | 701/466 |
| 2016/0202073 A1* | 7/2016 | Claycomb | ............ | G08B 25/016 |
| | | | | 701/400 |
| 2018/0003516 A1* | 1/2018 | Khasis | ..................... | G08G 1/20 |

\* cited by examiner

*Primary Examiner* — Nga X Nguyen

(57) ABSTRACT

A device receives re-routing event data identifying a deviation from a proposed route at a particular location. The device determines, based on the re-routing event data, whether the deviation from the proposed route is a problem deviation or a planned deviation, and associates, based on determining that the deviation from the proposed route is a problem deviation, the particular location with an problematic location tag. The device determines that a route, corresponding to a request for routing information received from a navigation device, includes the particular location, and determines, based on a user profile and the problematic location tag, a particular alert level, of a plurality of alert levels, to associate with the particular location. The device detects a proximity of the navigation device to the particular location, and causes a particular alert corresponding to the particular alert level to be provided via the navigation device.

20 Claims, 6 Drawing Sheets

AUTOMATED IDENTIFICATION OF PROBLEMATIC LOCATIONS FOR NAVIGATION AND ROUTE GUIDANCE MODIFICATION FOR DYNAMIC ALERTING

BACKGROUND

A navigation device, such as a mobile phone, a dedicated navigation device, and/or the like, can provide navigation information to a user to enable the user to direct a vehicle from a first location to a second location. For example, a navigation device can receive input identifying a destination, and can provide information identifying a route from a current location of the navigation device to the destination. In this case, a user, such as a vehicle driver, can drive a vehicle along the route to the destination by following route guidance provided by the navigation device. For example, the navigation device can provide, via a user interface, an alert regarding a turn, an exit, an arrival at a destination, and/or the like.

DETAILED DESCRIPTION OF PREFERRED EMBODIMENTS

Figure 1A:
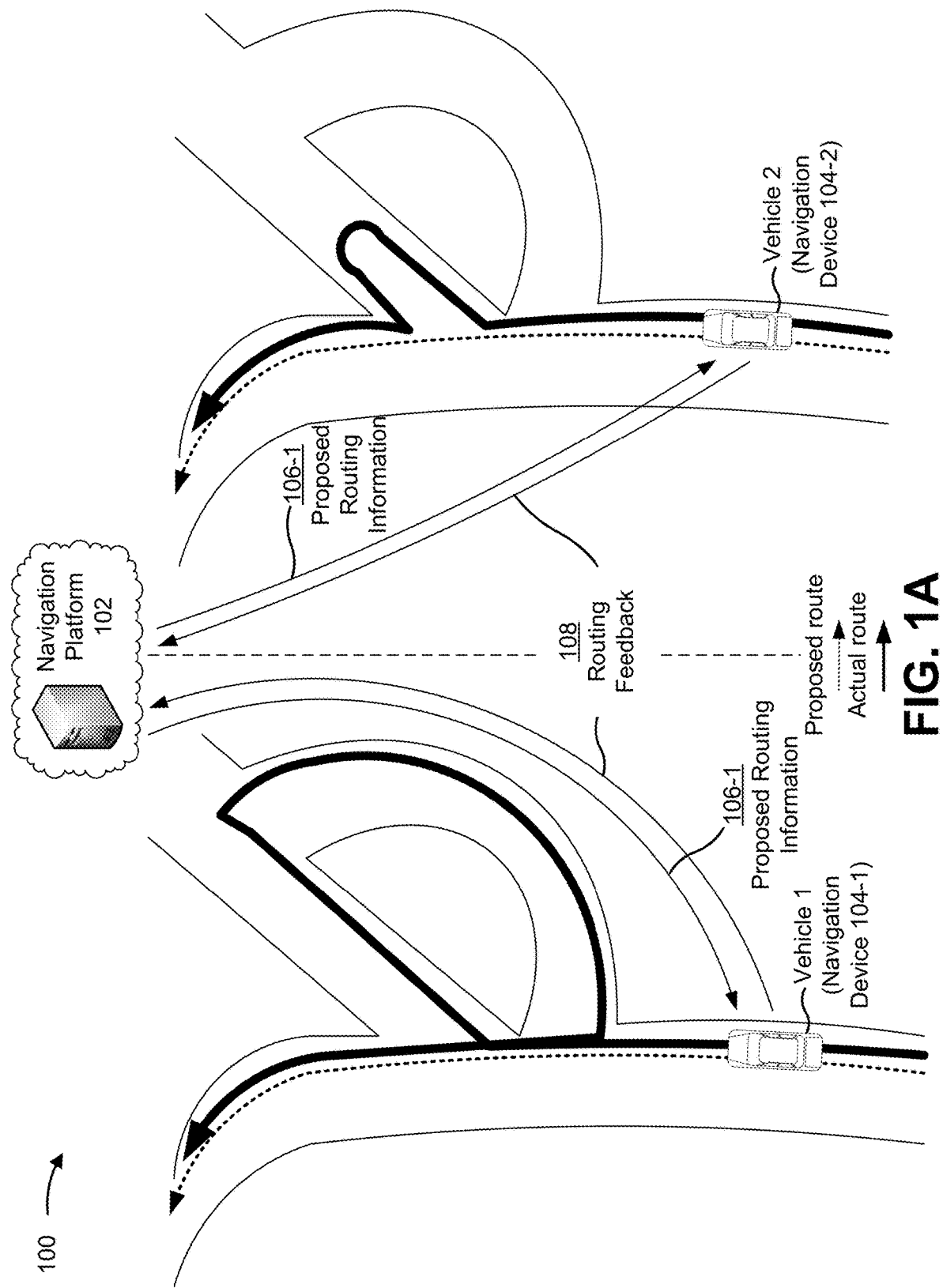
FIGS. 1A-1C is a diagram of an example implementation described herein.

The following detailed description of example implementations refers to the accompanying drawings. The same reference numbers in different drawings can identify the same or similar elements.

As described above, a navigation device can provide route guidance regarding a route to a destination. When the navigation device, and a vehicle associated therewith, approaches, for example, an exit from a highway, the navigation device can provide an alert that the vehicle is to turn onto the exit to exit the highway. For example, the navigation device can provide a user interface showing lanes of the highway and which lanes correspond to the exit to assist the user in locating the exit and exiting the highway. Alerts can be standardized. For example, a navigation device can provide, as a default, a set of standard alerts (e.g., an alert at two kilometers in advance of each exit of a route, at a half kilometer from each exit of the route, and at 100 yards from each exit of the route).

In some cases, the navigation device can determine when to provide an alert based on a speed of a vehicle and a type of a road. In other words, when the navigation device determines that the vehicle is moving at 80 kilometers per hour on a highway, the navigation device can provide alerts two kilometers in advance of an exit. In contrast, when the navigation device determines that the vehicle is moving at 40 kilometers per hour on a one lane road, the navigation device can provide alerts ¼ kilometer in advance of a turn. Similarly, the navigation device can receive user input associated with selecting how often to provide alerts, and the navigation device can forgo providing one or more alerts when a user indicates that the navigation device is to provide fewer alerts.

However, in some cases, routes can be confusing to a driver. For example, at a highway interchange, many different roads can converge, which can make it difficult for a driver to determine which exit the user is to take based on the user interface. Similarly, in some cases a turn can be hidden by an obstacle, such as a tree, a building, and/or the like, which can make it difficult for a driver to locate the turn with enough time to slow the vehicle and turn. Further, some route guidance can be confusing as a result of movement of the vehicle. For example, a voice alert indicating that a user is to "turn right now" based on a miscalculation of a vehicle's location can result in the driver following the voice alert literally and driving off a road. Confusing route guidance can result in a driver failing to accurately follow route guidance provided by the navigation device, which can cause delays to the driver, excess use of fuel, excess wear and tear on the vehicle, and/or the like. Moreover, sudden attempts to follow route guidance can result in a danger to a driver, to other drivers, to pedestrians, and/or the like.

Some implementations described herein enable determination of problematic locations and provide alert management for problematic locations. An problematic location can refer to a location at which route guidance is determined to result in users of a navigation device (e.g., drivers) becoming confused and failing to accurately follow the pre-configured route guidance. Pre-configured route guidance may include route guidance that is provided based on a speed of a vehicle, based on a preference of a user, and/or the like, as described in more detail below.

For example, a navigation platform can use information regarding re-routes (e.g., deviations where a user has failed to follow a planned route and has needed to, for example, turn around to return to the planned route) to identify locations at which route guidance is confusing. In this case, the navigation platform can alter alerts that are provided via a navigation device to a user, to ensure that the alerts are more likely to be accurately followed by the user. In this way, the navigation platform reduces a likelihood that the user becomes lost, needs to turn around, is forced to make a sudden adjustment to a vehicle, and/or the like, thereby improving vehicle safety, reducing fuel utilization, reducing vehicle wear and tear, and/or the like. Moreover, based on reducing a likelihood of needing updated route guidance to re-route back to a planned route, the navigation platform reduces a utilization of network traffic, a utilization of power resources, and/or the like.

Figure 1B:
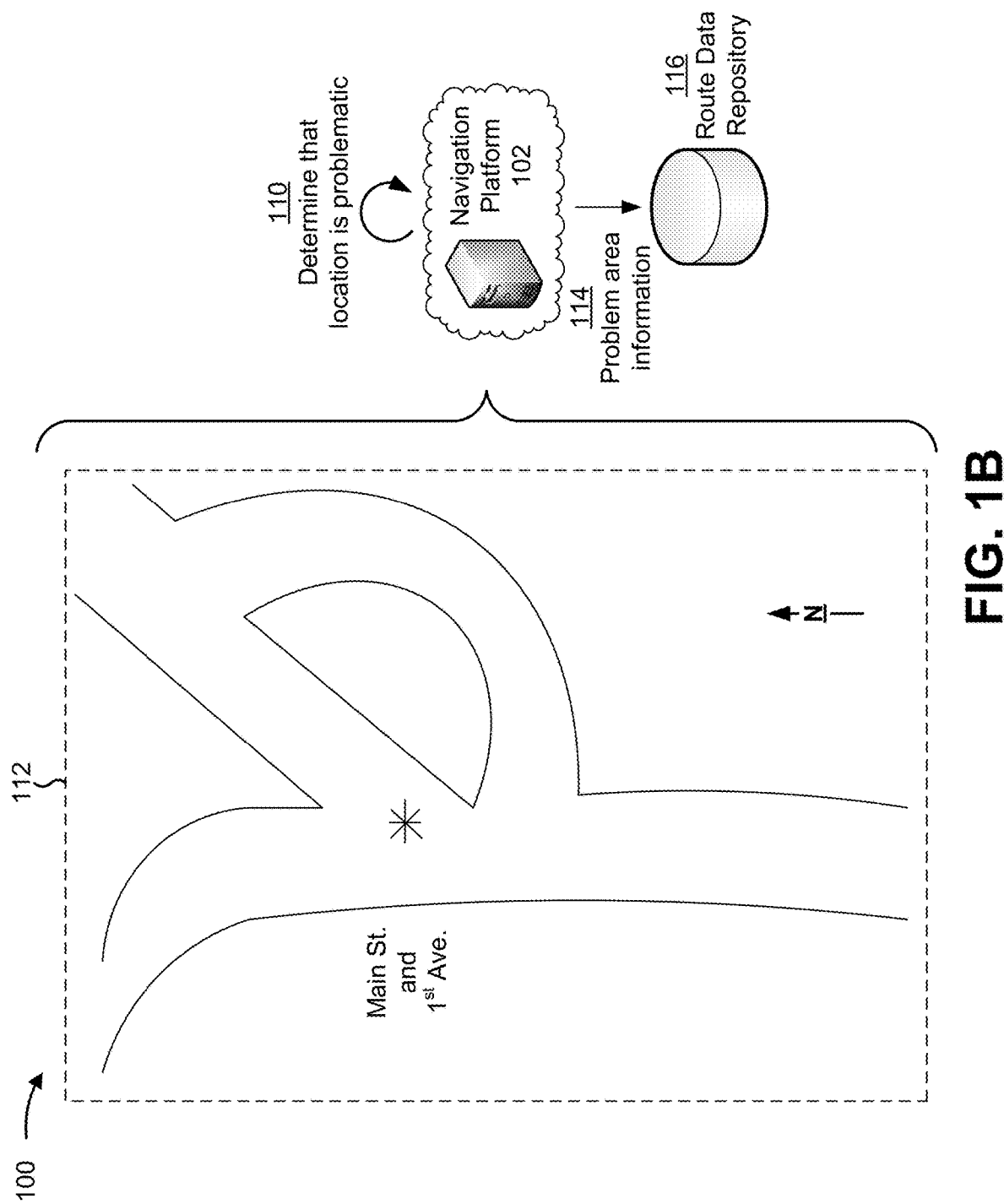
Figure 1C:
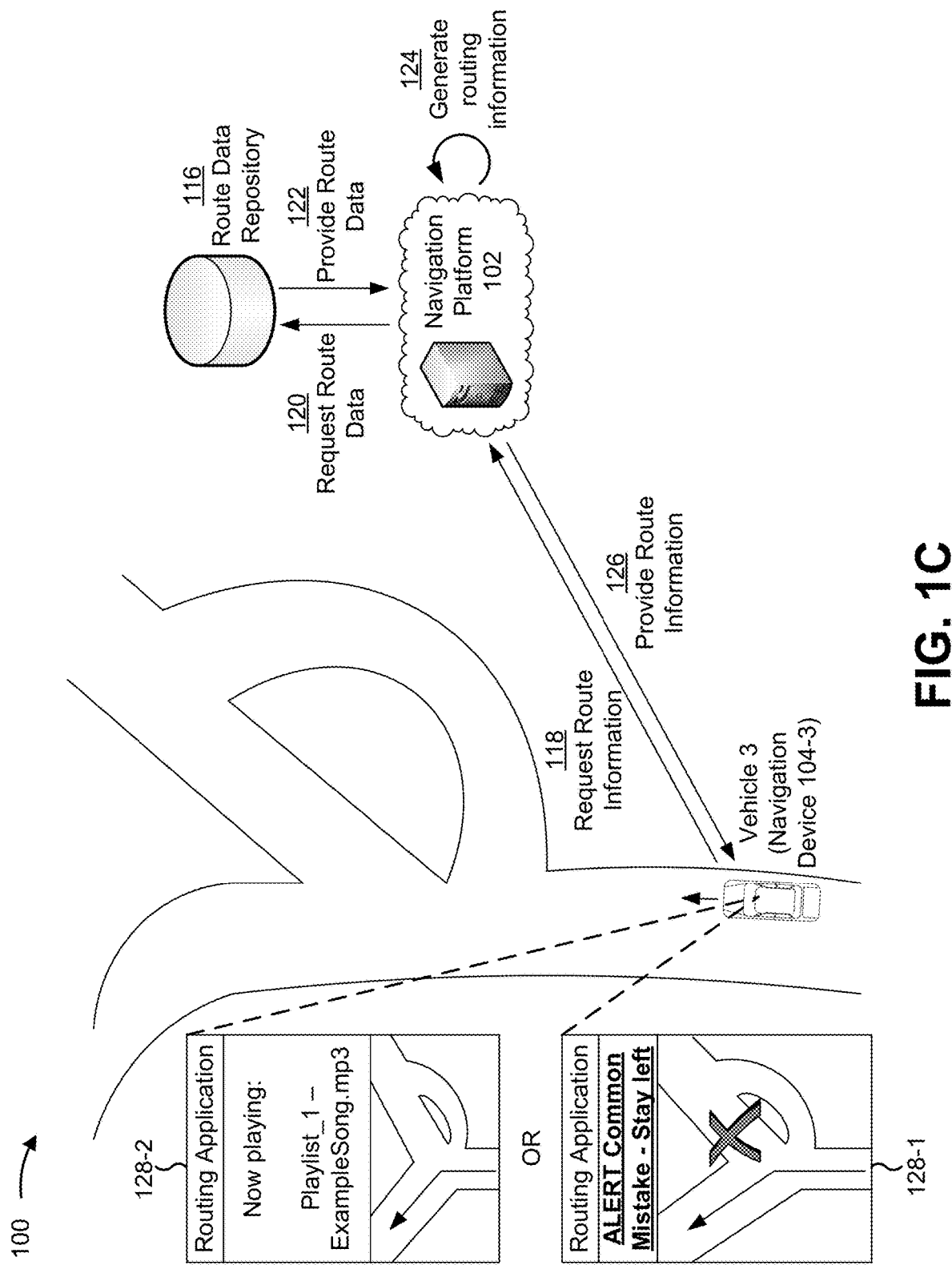

FIGS. 1A to 1C are diagrams of an example implementation 100 described herein. As shown in FIG. 1A, example implementation 100 includes a navigation platform 102, a first vehicle (shown as Vehicle 1) associated with a navigation device 104-1 in a first scenario at a first time, and a second vehicle (shown as Vehicle 2) associated with a navigation device 104-2 in a second scenario at a second time.

As further shown in FIG. 1A, and by reference numbers 106-1 and 106-2, navigation platform 102 can provide proposed routing information. The proposed routing information can include route guidance associated with a route along a particular road, as shown. For example, navigation platform 102 can provide proposed routing information that includes an alert for a turn. In this case, the alert can be a first alert level, such as a default alert level. As shown by reference number 108, based on the vehicles failing to accurately follow route guidance associated with the proposed routing information (e.g., based on a provided alert being confusing at a particular location), navigation devices 104 of the vehicles can provide actual routing information to navigation platform 102 as feedback.

In some implementations, the actual routing information can include re-route event data. For example, navigation device 104-1 can request new route information associated with returning to a proposed route at a location. In this case, navigation platform 102 can provide the new route information, and can store information identifying the re-route event and logging the location associated with the re-route event as a problematic location. Further, as shown, vehicle 1 can follow the new route in order to return to the proposed route (even though no re-route event data is provided to navigation device 104-1). In some implementations, the actual routing information can include information identifying a deviation from a proposed route. For example, as shown, navigation device 104-2 can provide information indicating that vehicle 2 made a wrong turn, and then made a U-turn to return to the proposed route.

In some implementations, navigation platform 102 can determine whether a deviation from a proposed route was a problem deviation or a planned deviation. A planned deviation can refer to a deviation from the proposed route based on a user's judgment rather than based on a mistake in following route guidance as can be the case for a problem deviation. For example, based on a vehicle being low on fuel, a user can cause a vehicle to exit from a highway to stop at a gas station. Similarly, a user can cause a vehicle to deviate from a proposed route to stop at another type of attraction (e.g., a restaurant), to avoid traffic, and/or the like. Additionally, or alternatively, a user can deviate from a proposed route to go to a destination that is different from a destination provided to navigation platform 102. For example, if when searching for a particular street address or attraction using a navigation device 104 does not return a result for the particular street address or attraction, a user can request route guidance to a nearby street address or attraction. In this case, the user can then intentionally deviate from a proposed route to go to the nearby street address or attraction rather than the particular street address or attraction.

In some implementations, navigation platform 102 can determine whether a deviation is a problem deviation or a planned deviation based on telematics data. For example, navigation platform 102 can receive telematics data indicating that after a deviation, fuel was added to a vehicle, and navigation platform 102 can determine that the deviation was a fuel stop (e.g., based on data from a vehicle on board diagnostics (OBD) device, based on navigation data identifying a location as a gas station, etc.), which can be a planned deviation. Similarly, navigation platform 102 can receive telematics data indicating that a tire pressure was increased, that a check engine light was turned off, and/or the like, which can indicate that the deviation was a planned deviation for vehicle maintenance. Additionally, or alternatively, navigation platform 102 can receive telematics data indicating that a vehicle was turned off, placed in park, reversed, and/or the like, which may be indicate whether a deviation was a problem deviation or a planned deviation.

In some implementations, navigation platform 102 can determine whether a deviation is a problem deviation or a planned deviation based on location data or attraction data. For example, navigation platform 102 can determine that a deviation resulted in a vehicle stopping at a point-of-interest, such as a rest stop, a restaurant, a park, and/or the like, and can determine that the deviation is a planned deviation. In some implementations, navigation platform 102 can determine whether a deviation is a problem deviation or a planned deviation based on traffic data. For example, navigation platform 102 can determine that a threshold level of traffic was present along a route, and that a deviation was onto a parallel route, which can indicate that the deviation was to avoid the traffic along the route. In some implementations, navigation platform 102 can determine whether a deviation is a problem deviation or a planned deviation based on timing data. For example, when a deviation occurs for greater than a threshold amount of time, navigation platform 102 can determine that the deviation was a planned deviation to another location rather than a problem deviation occurring by accident.

In some implementations, navigation platform 102 can determine whether a deviation is a problem deviation or a planned deviation based on routing data, braking data, steering data, or another type of data received from, for example, an on board diagnostics device of a vehicle. For example, when a vehicle deviates from a proposed route, and then U-turns back onto the proposed route, navigation platform 102 can determine that the deviation is a problem deviation. In some implementations, navigation platform 102 can receive user feedback via a user interface of a navigation device 104 indicating whether a deviation is a problem deviation or a planned deviation.

In some implementations, navigation platform 102 can train a machine learning model to distinguish between problem deviations and planned deviations based on multiple different factors, such as timing data, traffic data, telematics data, and/or the like. For example, navigation platform 102 may obtain thousands, millions, or billions of data points regarding vehicle operation. In this case, navigation platform 102 may process the data points to generate a model of vehicle travel. For example, navigation platform 102 may assign and adjust a set of weights based on a first subset of the data points, and may validate accuracy of the set of weights using a second subset of data points, to determine weights for evaluating subsequent data points in distinguishing between problem deviations and planned deviations. In some implementations, navigation platform 102 may use neural network techniques, deep learning techniques, parameter reduction techniques, and/or the like.

As shown in FIG. 1B, and by reference number 110, navigation platform 102 can determine that a particular location is to be classified as a problematic location. A problematic location can refer to a location at which problem deviations occur with a threshold frequency. For example, navigation platform 102 may determine the particular location is a problematic location based on a threshold quantity of problem deviations within a threshold period of time. In other words, navigation platform 102 may classify a problematic location when a problem deviation occurs in 1 out of every 3 trips past the particular location, but may not classify a problematic location when 2 deviations occur within a single day, but 100 successful completions of routes through the particular location occur during the same day. Although described herein in terms of particular thresholds, other thresholds and/or factors are possible.

For example, navigation platform 102 can determine, based on the actual routing information received from navigation devices 104, that a particular location is a problematic location (shown as an intersection of Main St. and 1st Ave.). In some implementations, navigation platform 102 can determine that a location is a problematic location for a particular direction of travel. For example, as shown by reference number 112, navigation platform 102 can determine that the location is a problematic location for northbound travel, and not for southbound travel. In some implementations, navigation platform 102 can determine that the location is a particular type of problematic location, such as a problematic location associated with a missed turn (e.g., associated with sudden braking), a problematic location associated with an incorrect turn (e.g., associated with causing drivers to U-turn to return to a correct route or return to a missed turn-off in another example), and/or the like. In this case, each type of problematic location can be associated with a different alteration to alerts that are provided in connection with route guidance.

In some implementations, navigation platform 102 can determine to associate the particular location with an problematic location tag. For example, navigation platform 102 can include data, in a data repository storing information regarding routing at the particular location, indicating that routing and/or route guidance can be adjusted in connection with the particular location. In this case, navigation platform 102 can determine that additional alerts can be provided in connection with the particular location to reduce a likelihood of a problem deviation. In some implementations, navigation platform 102 can determine that the particular location is to be avoided when routing based on the problematic location tag. For example, navigation platform 102 can determine, based on a likelihood that a vehicle deviates from a proposed route at the particular location and an amount of time to return to the proposed route, that routing is to occur via another, longer route that avoids the particular location, thereby avoiding time wasted returning to the proposed route after a deviation.

In some implementations, based on the problematic location tag, navigation platform 102 can determine an alert level of a set of alert levels for route guidance in connection with the particular location. For example, navigation platform 102 can determine, based on classifying the particular location as a problematic location, to escalate the particular location from a first alert level to a second, higher alert level. In some implementations, different alert levels can be associated with different user experiences. For example, at a first alert level, navigation platform 102 can provide visual route guidance via a navigation user interface; at a second alert level, navigation platform 102 can interrupt use of another user interface view (e.g., another application) to provide visual route guidance; at a third alert level, navigation platform 102 can provide audio route guidance in addition to visual route guidance; and/or the like. Additionally, or alternatively, at different alert levels, navigation platform 102 can alter a route marker, a map opacity, a map zoom level, a voice prompt, a pop-up notification, a map icon, interrupt use of another application (e.g., turn off music from an audio application, a satellite radio, and/or the like to ensure that a user can hear an alert and distinguishes the alert from the music) and/or the like to reduce a likelihood that a user is unable to follow a proposed route.

Although some implementations are described herein in terms of navigation platform 102 identifying a problematic location and escalating to a higher alert level, in some implementations, a navigation device 104 may, based on information indicating that a location is a problematic location, escalate to a higher alert level without instruction from navigation platform 102.

Additionally, or alternatively, navigation platform 102 can alter a distance from a particular location at which route guidance is provided, a content of the route guidance (e.g., how a particular route is described in text or in voice prompts), and/or the like. As shown by reference number 114, navigation platform 102 can provide problem area information to route data repository 116. For example, navigation platform 102 can provide information identifying the problematic location tag, an alert level selected for the particular location, and/or the like. In this way, navigation platform 102 can ensure that subsequent routing in connection with the particular location is performed based on the problematic location tag (e.g., a particular alert level is provided during route guidance, the particular location is avoided when determining a route, and/or the like).

In some implementations, navigation platform 102 can perform one or more other actions as a response to receiving information indicating that a particular location is a problematic location. For example, navigation platform 102 can identify connected digital signage within a threshold proximity of the particular location, and can transmit updated signage information to automatically adjust the connected digital signage to provide information associated with reducing a likelihood that drivers deviate from intended routes (e.g., by altering text in a sign, by causing a sign to start flashing, by causing a sign to provide visual route guidance, etc.). Additionally, or alternatively, navigation platform 102 can automatically deploy an autonomous vehicle to the particular location to remap the particular location (e.g., to identify a change to a lane pattern, a change to an availability of an exit, a road closure, etc.), thereby obtaining more up-to-date mapping information that can be provided via a navigation application to reduce a likelihood of a user deviating from an intended route.

As shown in FIG. 1C, and by reference number 118, navigation platform 102 can receive a request for route information. For example, a navigation device 104-3 associated with another vehicle (shown as Vehicle 3) can request route guidance for a route that passes through the particular location. Additionally, or alternatively, during route guidance, navigation platform 102 can receive information indicating that navigation device 104-3 is within a threshold proximity of the particular location, based on navigation platform 102 monitoring navigation device 104-3, to trigger navigation platform 102 to provide route guidance associated with the particular location. As shown by reference numbers 120 and 122, navigation platform 102 can request route data relating to the particular location from route data repository 116. In some implementations, navigation platform 102 performs lookups to determine whether any locations within a proximity of navigation device 104-3 or on a route for which navigation device 104-3 is providing guidance are problematic locations, and may alert navigation device 104-3 of the problematic locations to ensure that alert levels are raised for the problematic locations.

As further shown in FIG. 1C, and by reference number 124, navigation platform 102 can generate routing information associated with the particular location. For example, based on the problematic tag associated with the particular location, navigation platform 102 can determine to provide a particular alert during route guidance that is different from, for example, a default alert. In some implementations, navigation platform 102 can dynamically select an alert level based on other information. For example, based on a user profile indicating that a user has traveled a particular route a threshold quantity of times, navigation platform 102 can reduce an alert level for the particular location for a user. In this way, navigation platform 102 accounts for some users already knowing a route and therefore being less likely to deviate unintentionally from a proposed route. Moreover, based on selectively reducing an alert level, navigation platform 102 reduces interruptions to applications operating on navigation device 104-3, thereby resulting in a more efficient utilization of energy resources.

As further shown in FIG. 1C, and by reference number 126, navigation platform 102 can provide route information, which can result in navigation device 104-3 providing a user interface view 128-1 or 128-2. For example, when the particular location is associated with a first, higher alert level, navigation platform 102 can cause navigation device 104-3 to provide a user interface view 128-1 that includes a large icon indicating which route not to take and a bolded, underlined alert to alert a user to a common driving mistake (e.g., "Problem Area—Stay Left"). In this way, navigation platform 102 reduces a likelihood, for problematic locations, that a user accidentally deviates from a route. Alternatively, when the particular location is associated with a second, lower alert level, navigation platform 102 can cause navigation device 104-3 to provide a user interface that does not include the large icon, and that does not interrupt a user view of another application (e.g., a music application). In this way, navigation platform 102 reduces an interruption to the user's use of navigation device 104-3, thereby reducing a utilization of processing resources by navigation device 104-3 associated with a user attempting to return to a previous function of navigation device 104-3 (e.g., using another application). In some implementations, navigation device 104-3 may request control of an external display to cause an alert to be provided for display, and may alter how much of a screen of the external display navigation device 104-3 controls based on an alert level.

As indicated above, the implementation depicted in FIGS. 1A-1C is provided merely as an example. Other examples can differ from what is described with regard to FIGS. 1A-1C.

Figure 2:
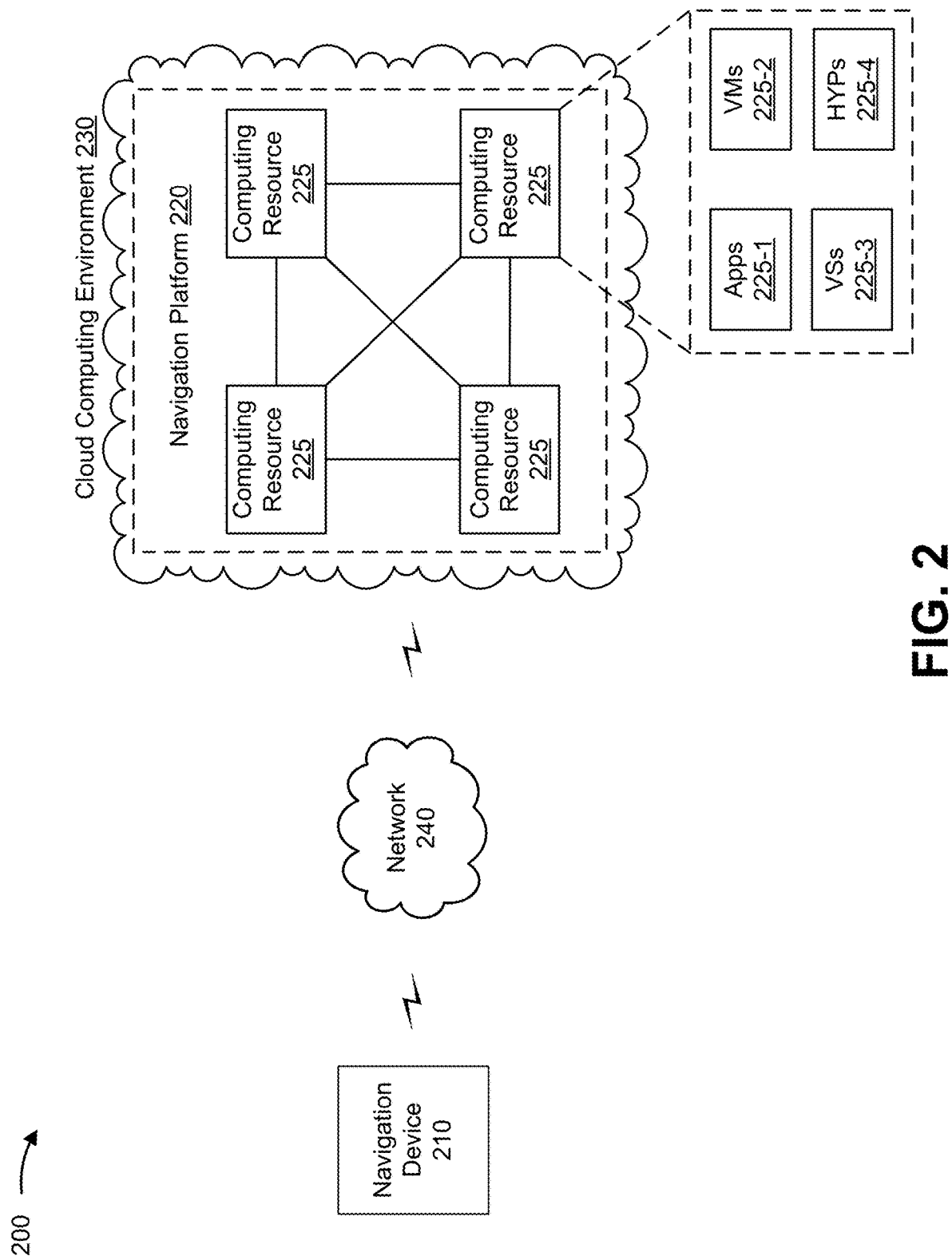
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a navigation device 210, a navigation platform 220, a computing resource 225, a cloud computing environment 230, and a network 240. Devices of environment 200 can interconnect via wired connections, wireless connections, or a combination of wired and wireless connections.

Navigation device 210 can include one or more devices capable of receiving, generating, storing, processing, and/or providing information associated with route guidance. For example, navigation device 210 can include a wireless communication device, a radiotelephone, a personal communications system (PCS) terminal (e.g., that can combine a cellular radiotelephone with data processing and data communications capabilities), a smart phone, a Global Positioning System (GPS) device, a laptop computer, a tablet computer, a personal gaming system, user equipment, and/or a similar device. In some implementations, navigation device 210 can include an Internet of Things (IoT) device, such as a narrowband IoT (NB-IoT) device, and/or the like. In some implementations, navigation device 210 can include and/or communicate with an OBD device to obtain information regarding a vehicle, such as fuel-level information, acceleration information, braking information, turning information, gear-shifting information, and/or the like, which can be used to identify a problematic location.

Navigation platform 220 includes one or more computing resources assigned to manage routing information for a set of navigation devices 210. For example, navigation platform 220 can be a platform implemented by cloud computing environment 230 that can identify problematic locations, and can adjust alerts that are provided by navigation devices 210 when providing route guidance in connection with the problematic locations. In some implementations, navigation platform 220 is implemented by computing resources 225 of cloud computing environment 230.

Navigation platform 220 can include a server device or a group of server devices. In some implementations, navigation platform 220 can be hosted in cloud computing environment 230. Notably, while implementations described herein describe navigation platform 220 as being hosted in cloud computing environment 230, in some implementations, navigation platform 220 can be non-cloud-based or can be partially cloud-based.

Cloud computing environment 230 includes an environment that delivers computing as a service, whereby shared resources, services, etc. can be provided to manage routing information for a set of navigation devices 210. Cloud computing environment 230 can provide computation, software, data access, storage, and/or other services that do not require end-user knowledge of a physical location and configuration of a system and/or a device that delivers the services. As shown, cloud computing environment 230 can include navigation platform 220 and a computing resource 225.

Computing resource 225 includes one or more personal computers, workstation computers, server devices, or another type of computation and/or communication device. In some implementations, computing resource 225 can host navigation platform 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by navigation device 210. Application 225-1 can eliminate a need to install and execute the software applications on navigation device 210. For example, application 225-1 can include software associated with navigation platform 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., navigation device 210), and can manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
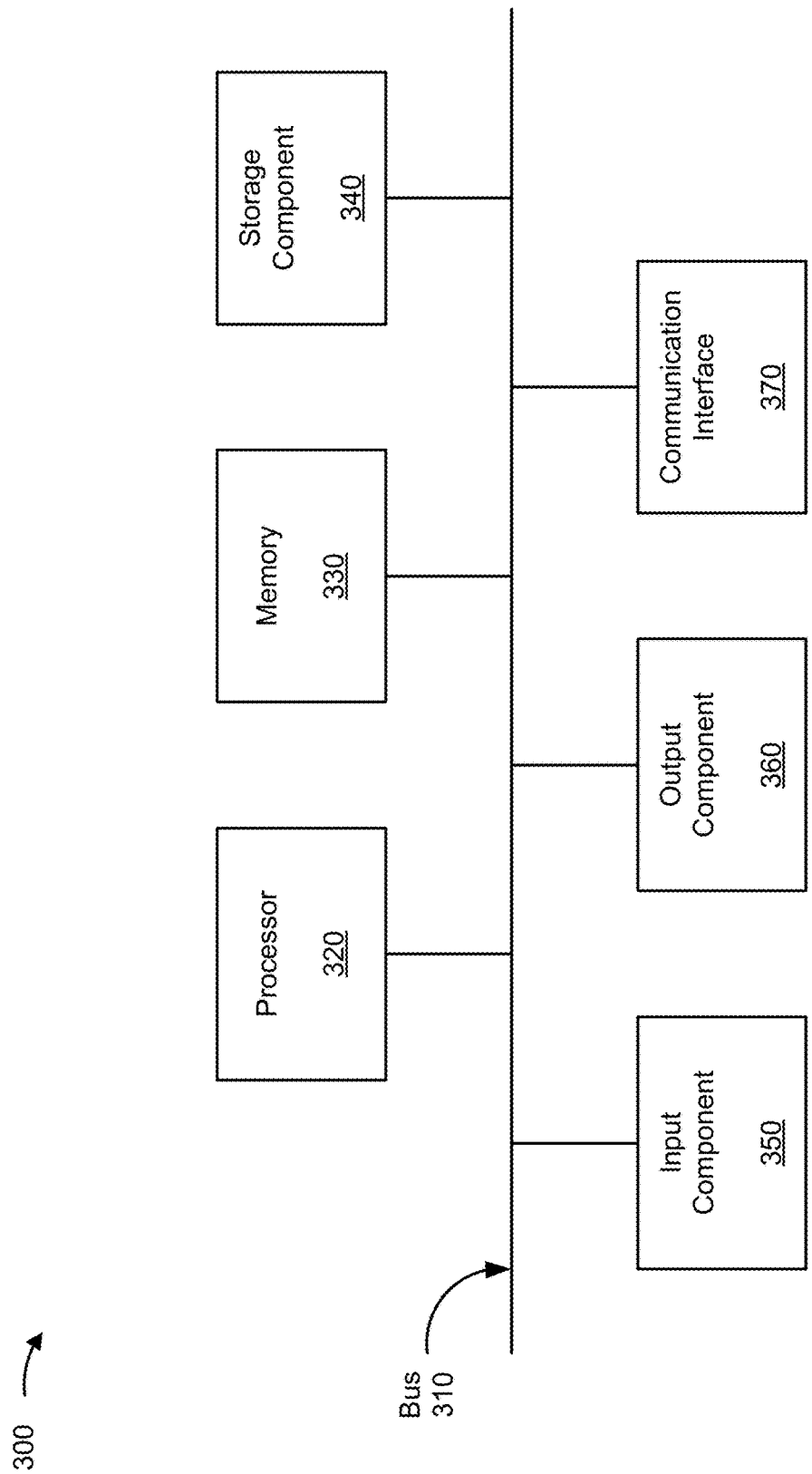
FIG. 3 is a diagram of example components of one or more devices of FIG. 2.

FIG. 3 is a diagram of example components of a device 300. Device 300 can correspond to navigation device 210, navigation platform 220, and/or computing resource 225. In some implementations, navigation device 210, navigation platform 220, and/or computing resource 225 can include one or more devices 300 and/or one or more components of device 300. As shown in FIG. 3, device 300 can include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
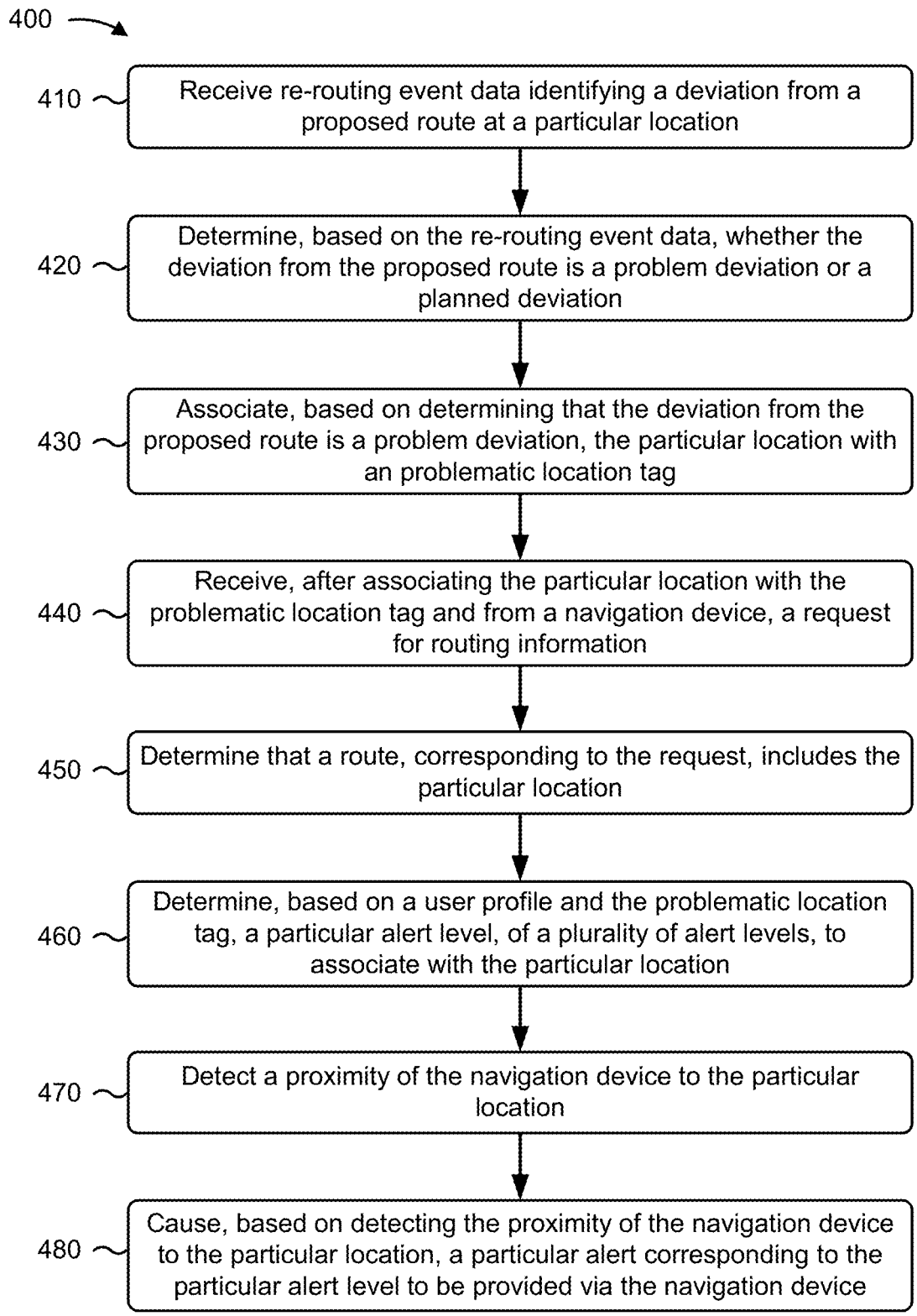
FIG. 4 is a flow chart of an example process for problematic location identification and alert management for vehicle navigation services.

FIG. 4 is a flow chart of an example process 400 for problematic location identification and alert management for vehicle navigation services. In some implementations, one or more process blocks of FIG. 4 can be performed by a navigation platform (e.g. navigation platform 220). In some implementations, one or more process blocks of FIG. 4 can be performed by another device or a group of devices separate from or including a navigation platform (e.g. navigation platform 220), such as a navigation device (e.g. navigation device 210) and a computing resource (e.g. computing resource 225).

As shown in FIG. 4, process 400 can include receiving re-routing event data identifying a deviation from a proposed route at a particular location (block 410). For example, the navigation platform (using, e.g., computing resource 225, processor 320, memory 330, storage component 340, input component 350, communication interface 370, and/or the like) can receive re-routing event data identifying a deviation from a proposed route at a particular location, as described above.

As further shown in FIG. 4, process 400 can include determining, based on the re-routing event data, whether the deviation from the proposed route is a problem deviation or a planned deviation (block 420). For example, the navigation platform (using, e.g., computing resource 225, processor 320, memory 330, storage component 340, and/or the like) can determine, based on the re-routing event data, whether the deviation from the proposed route is a problem deviation or a planned deviation, as described above.

As further shown in FIG. 4, process 400 can include associating, based on determining that the deviation from the proposed route is a problem deviation, the particular location with an problematic location tag (block 430). For example, the navigation platform (using, e.g., computing resource 225, processor 320, memory 330, storage component 340, and/or the like) can associate, based on determining that the deviation from the proposed route is a problem deviation, the particular location with an problematic location tag, as described above.

As further shown in FIG. 4, process 400 can include receiving, after associating the particular location with the problematic location tag and from a navigation device, a request for routing information (block 440). For example, the navigation platform (using, e.g., computing resource 225, processor 320, memory 330, storage component 340, input component 350, communication interface 370, and/or the like) can receive, after associating the particular location with the problematic location tag and from a navigation device, a request for routing information, as described above.

As further shown in FIG. 4, process 400 can include determining that a route, corresponding to the request, includes the particular location (block 450). For example, the navigation platform (using, e.g., computing resource 225, processor 320, memory 330, storage component 340, and/or the like) can determine that a route, corresponding to the request, includes the particular location, as described above.

As further shown in FIG. 4, process 400 can include determining, based on a user profile and the problematic location tag, a particular alert level, of a plurality of alert levels, to associate with the particular location (block 460). For example, the navigation platform (using, e.g., computing resource 225, processor 320, memory 330, storage component 340, and/or the like) can determine, based on a user profile and the problematic location tag, a particular alert level, of a plurality of alert levels, to associate with the particular location, as described above.

As further shown in FIG. 4, process 400 can include detecting a proximity of the navigation device to the particular location (block 470). For example, the navigation platform (using, e.g., computing resource 225, processor 320, memory 330, storage component 340, input component 350, communication interface 370, and/or the like) can detect a proximity of the navigation device to the particular location, as described above.

As further shown in FIG. 4, process 400 can include causing, based on detecting the proximity of the navigation device to the particular location, a particular alert corresponding to the particular alert level to be provided via the navigation device (block 480). For example, the navigation platform (using, e.g., computing resource 225, processor 320, memory 330, storage component 340, output component 360, communication interface 370, and/or the like) can cause, based on detecting the proximity of the navigation device to the particular location, a particular alert corresponding to the particular alert level to be provided via the navigation device, as described above.

Process 400 can include additional implementations, such as any single implementation or any combination of implementations described below and/or in connection with one or more other processes described elsewhere herein.

In some implementations, the navigation platform can detect, for the navigation device, whether a successful completion of another route including the particular location occurred, and can store, in the user profile, information identifying whether the successful completion of the other route including the particular location occurred. Additionally, when determining the particular alert level, the navigation platform can determine the particular alert level based on whether the successful completion of the other route including the particular location occurred.

In some implementations, when determining that the route includes the particular location, the navigation platform can determine that the route includes the particular location based on a direction of the route with respect to the particular location. In some implementations, the particular alert level can be associated with at least one user experience feature not included in another alert level of the plurality of alert levels, and the at least one user experience feature can be at least one of a route marker, a map opacity, a map zoom level, a voice prompt, a pop-up notification, or a map icon.

In some implementations, when determining, based on the re-routing event data, whether the deviation from the proposed route is a problem deviation or a planned deviation, the navigation platform can determine whether the deviation from the proposed route is the problem deviation or the planned deviation based on at least one of location data identifying a return to the proposed route, braking data identifying braking applied to a vehicle, steering data identifying a steering applied to the vehicle, location data identifying one or more points-of-interest within a threshold proximity of the particular location, or traffic data identifying a level of traffic at the particular location at a time of the deviation from the proposed route.

In some implementations, the navigation platform can automatically deploy, based on the re-routing event data, an autonomous vehicle to remap the particular location. In some implementations, the navigation platform can transmit updated signage information to alter digital signage within a threshold proximity to the particular location based on the re-routing event data.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive re-routing event data identifying a deviation from a proposed route at a location;
determine, based on the re-routing event data, whether the deviation from the proposed route is a problem deviation or a planned deviation utilizing a machine learning model,
wherein the planned deviation is associated with a deviation from the proposed route based on an intentional deviation in following route guidance,
wherein the problem deviation is associated with a deviation from the proposed route based on an unintentional deviation in following the route guidance, and
wherein the machine learning model is trained to distinguish between the problem deviation and the planned deviation based on multiple factors including at least one of:
timing data,
traffic data, or
telematics data;
associate, based on determining that the deviation from the proposed route is the problem deviation, the location with a problematic location tag,
wherein the location is not associated with a problematic location tag based on determining that the deviation from the proposed route is the planned deviation;
receive, after associating the location with the problematic location tag and from a navigation device, a request for routing information;
determine that a route, corresponding to the request, includes the location;
determine, based on a user profile and the problematic location tag, an alert level, of a plurality of alert levels, to associate with the location;
detect a proximity of the navigation device to the location; and
cause, based on detecting the proximity of the navigation device to the location, an alert corresponding to the alert level to be provided via the navigation device.

2. The device of claim 1, wherein the one or more processors are further configured to:

detect, for the navigation device, whether a successful completion of another route including the location occurred;
store, in the user profile, information identifying whether the successful completion of the other route including the location occurred; and
wherein the one or more processors, when determining the alert level, are configured to:
determine the alert level based on whether the successful completion of the other route including the location occurred.

3. The device of claim 1, wherein the one or more processors, when determining that the route includes the location, are configured to:
determine that the route includes the location based on a direction of the route with respect to the location.

4. The device of claim 1, wherein the alert level is associated with at least one user experience feature not included in a different alert level of the plurality of alert levels, and
wherein the at least one user experience feature is at least one of:
a route marker,
a map opacity,
a map zoom level,
a voice prompt,
a pop-up notification, or
a map icon.

5. The device of claim 1, wherein the one or more processors, when determining, based on the re-routing event data, whether the deviation from the proposed route is a problem deviation or a planned deviation, are configured to:
determine whether the deviation from the proposed route is the problem deviation or the planned deviation based on at least one of:
location data identifying a return to the proposed route,
braking data identifying braking applied to a vehicle,
steering data identifying a steering applied to the vehicle, or
location data identifying one or more points-of-interest within a threshold proximity of the location, and
wherein the traffic data identifies a level of traffic at the location at a time of the deviation from the proposed route.

6. The device of claim 1, wherein the one or more processors are configured further to:
automatically deploy, based on the re-routing event data, an autonomous vehicle to remap the location.

7. The device of claim 1, wherein the one or more processors are further configured to:
transmit updated signage information to alter digital signage within a threshold proximity to the location based on the re-routing event data.

8. A non-transitory computer-readable medium storing one or more instructions for wireless communication, the one or more instructions comprising:
one or more instructions that, when executed by one or more processors of a device, cause the one or more processors to:
receive re-routing event data identifying a deviation from a proposed route at a location;
determine, based on the re-routing event data, whether the deviation from the proposed route is a problem deviation or a planned deviation utilizing a machine learning model,
wherein the planned deviation is associated with a deviation from the proposed route based on an intentional deviation in following route guidance,
wherein the problem deviation is associated with a deviation from the proposed route based on an unintentional deviation in following the route guidance, and
wherein the machine learning model is trained to distinguish between the problem deviation and the planned deviation based on multiple factors including at least one of:
timing data,
traffic data, or
telematics data;
associate, based on determining that the deviation from the proposed route is the problem deviation, the location with a problematic location tag,
wherein the location is not associated with theft problematic location tag based on determining that the deviation from the proposed route is theft planned deviation;
receive, after associating the location with the problematic location tag and from a navigation device, a request for routing information;
determine that a route, corresponding to the request, includes the location;
determine, based on a user profile and the problematic location tag, an alert level, of a plurality of alert levels, to associate with the location;
detect a proximity of the navigation device to the location; and
cause, based on detecting the proximity of the navigation device to the location, an alert corresponding to the alert level to be provided via the navigation device.

9. The non-transitory computer-readable medium of claim 8, wherein the one or more instructions, when executed by the one or more processors, further cause the one or more processors to:
detect, for the navigation device, whether a successful completion of another route including the location occurred;
store, in the user profile, information identifying whether the successful completion of the other route including the location occurred; and
wherein the one or more instructions, that cause the one or more processors to determine the alert level, cause the one or more processors to:
determine the alert level based on whether the successful completion of the other route including the location occurred.

10. The non-transitory computer-readable medium of claim 8, wherein the one or more instructions, that cause the one or more processors to determine that the route includes the location, cause the one or more processors to:
determine that the route includes the location based on a direction of the route with respect to the location.

11. The non-transitory computer-readable medium of claim 8, wherein the alert level is associated with at least one user experience feature not included in a different alert level of the plurality of alert levels, and
wherein the at least one user experience feature is at least one of:
a route marker,
a map opacity,
a map zoom level,
a voice prompt, a pop-up notification, or
a map icon.

12. The non-transitory computer-readable medium of claim 8, wherein the one or more instructions, that cause the one or more processors to determine, based on the re-routing event data, whether the deviation from the proposed route is a problem deviation or a planned deviation, cause the one or more processors to:
determine whether the deviation from the proposed route is the problem deviation or the planned deviation based on at least one of:
location data identifying a return to the proposed route,
braking data identifying braking applied to a vehicle,
steering data identifying a steering applied to the vehicle, or
location data identifying one or more points-of-interest within a threshold proximity of the location, and
wherein the traffic data identifies a level of traffic at the location at a time of the deviation from the proposed route.

13. The non-transitory computer-readable medium of claim 8, wherein the one or more instructions, when executed by the one or more processors, further cause the one or more processors to:
automatically deploy, based on the re-routing event data, an autonomous vehicle to remap the location.

14. The non-transitory computer-readable medium of claim 8, wherein the one or more instructions, when executed by the one or more processors, further cause the one or more processors to:
transmit updated signage information to alter digital signage within a threshold proximity to the location based on the re-routing event data.

15. A method, comprising:
receiving, by a device, re-routing event data identifying a deviation from a proposed route at a location;
determining, by the device and based on the re-routing event data, whether the deviation from the proposed route is a problem deviation or a planned deviation utilizing a machine learning model,
wherein the planned deviation is associated with a deviation from the proposed route based on an intentional deviation in following route guidance,
wherein the problem deviation is associated with a deviation from the proposed route based on an unintentional deviation in following the route guidance, and
wherein the machine learning model is trained to distinguish between the problem deviation and the planned deviation based on multiple factors including at least one of:
timing data,
traffic data, or
telematics data;
associating, by the device and based on determining that the deviation from the proposed route is the problem deviation, the location with a problematic location tag,
wherein the location is not associated with the problematic location tag based on determining that the deviation from the proposed route is the planned deviation;

receiving, by the device and after associating the location with the problematic location tag and from a navigation device, a request for routing information;
determining, by the device, that a route, corresponding to the request, includes the location;
determining, by the device and based on a user profile and the problematic location tag, an alert level, of a plurality of alert levels, to associate with the location;
detecting, by the device, a proximity of the navigation device to the location; and
causing, by the device and based on detecting the proximity of the navigation device to the location, an alert corresponding to the alert level to be provided via the navigation device.

16. The method of claim 15, further comprising:
detecting, for the navigation device, whether a successful completion of another route including the location occurred;
storing, in the user profile, information identifying whether the successful completion of the other route including the location occurred; and
wherein determining the alert level comprises:
determining the alert level based on whether the successful completion of the other route including the location occurred.

17. The method of claim 15, wherein determining that the route includes the location comprises:
determining that the route includes the location based on a direction of the route with respect to the location.

18. The method of claim 15, wherein the alert level is associated with at least one user experience feature not included in another alert level of the plurality of alert levels, and
wherein the at least one user experience feature is at least one of:
a route marker,
a map opacity,
a map zoom level,
a voice prompt,
a pop-up notification, or
a map icon.

19. The method of claim 15, wherein determining, based on the re-routing event data, whether the deviation from the proposed route is a problem deviation or a planned deviation comprises:
determining whether the deviation from the proposed route is the problem deviation or the planned deviation based on at least one of:
location data identifying a return to the proposed route,
braking data identifying braking applied to a vehicle,
steering data identifying a steering applied to the vehicle, or
location data identifying one or more points-of-interest within a threshold proximity of the location, and
wherein the traffic data identifies a level of traffic at the location at a time of the deviation from the proposed route.

20. The method of claim 15, further comprising:
automatically deploying, based on the re-routing event data, an autonomous vehicle to remap the location.

* * * * *